(12) United States Patent
Ortega et al.

(10) Patent No.: US 6,974,178 B2
(45) Date of Patent: Dec. 13, 2005

(54) AERODYNAMIC DRAG REDUCTION APPARATUS FOR WHEELED VEHICLES IN GROUND EFFECT

(75) Inventors: Jason M. Ortega, Pacifica, CA (US); Kambiz Salari, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/786,531

(22) Filed: Feb. 24, 2004

(65) Prior Publication Data

US 2005/0161976 A1   Jul. 28, 2005

Related U.S. Application Data

(60) Provisional application No. 60/475,211, filed on May 30, 2003.

(51) Int. Cl.⁷ ................................................ B60R 9/00

(52) U.S. Cl. .............................. 296/180.1; 296/180.4
(58) Field of Search ........................... 296/180.1, 180.4

(56) References Cited

U.S. PATENT DOCUMENTS

| | | | | |
|---|---|---|---|---|
| 4,418,853 A | * | 12/1983 | Shaffer | 224/401 |
| 5,280,990 A | * | 1/1994 | Rinard | 296/180.1 |

* cited by examiner

*Primary Examiner*—Joseph D. Pape
(74) *Attorney, Agent, or Firm*—James S. Tak; Alan H. Thompson

(57) ABSTRACT

An apparatus for reducing the aerodynamic drag of a wheeled vehicle in a flowstream, the vehicle having a vehicle body and a wheel assembly supporting the vehicle body. The apparatus includes a baffle assembly adapted to be positioned upstream of the wheel assembly for deflecting airflow away from the wheel assembly so as to reduce the incident pressure on the wheel assembly.

5 Claims, 4 Drawing Sheets

AERODYNAMIC DRAG REDUCTION APPARATUS FOR WHEELED VEHICLES IN GROUND EFFECT

I. CLAIM OF PRIORITY IN PROVISIONAL APPLICATION

This application claims priority in provisional application filed on May 30, 2003, entitled "Drag Reduction of a Tractor-Trailer by Means of Under-Trailer Skirts" Ser. No. 60/475,211, by Jason M. Ortega et al, and incorporated by reference herein.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to aerodynamic drag reduction methods. The invention relates more particularly to an apparatus for reducing the aerodynamic drag of a wheeled vehicle in a flow stream by reducing the drag produced by a wheel assembly supporting the vehicle.

III. BACKGROUND OF THE INVENTION

It is well known in the art of vehicle design that the fuel consumption of a vehicle associated with its movement is directly related to certain aerodynamic characteristics of the vehicle, such as the aerodynamic drag of the vehicle expressed as the drag coefficient, Cd. As the aerodynamic drag experienced by a vehicle increases, the fuel costs also correspondingly increase due to the greater energy required to overcome the drag. For example, for a vehicle traveling 70 mph on a roadway, approximately 65% of the total fuel consumption of its engine is used to overcome aerodynamic drag. Thus, even a slight reduction in the aerodynamic drag coefficient of the vehicle can result in a significant improvement in fuel economy.

For wheeled vehicles having one or more wheel assemblies supporting a body portion, aerodynamic drag is attributable in part to airflow impinging directly on the wheel assembly. In particular, wheeled vehicles having a body portion with a relatively high ground clearance, such as trailers in tractor-trailer towing arrangements, have a much larger wheel assembly exposed to the impinging airflow. Thus the need for reducing the aerodynamic drag of wheeled vehicles, especially land-based vehicles traveling at, for example, highway speeds, are compelling and widely recognized. It would therefore be advantageous to provide a simple cost-effective aerodynamic drag reduction apparatus which reduces the aerodynamic drag caused by the wheel assembly of a wheeled-axle vehicle, such as a tractor-trailer, to thereby reduce the net aerodynamic drag.

IV. SUMMARY OF THE INVENTION

One aspect of the present invention includes an apparatus for reducing the aerodynamic drag of a wheeled vehicle in a flowstream, said vehicle having a vehicle body and a wheel assembly supporting the vehicle body from thereunder, comprising: a baffle assembly having means for mounting to the wheeled vehicle upstream of the wheel assembly so as to deflect airflow away from the wheel assembly and reduce the incident pressure thereon.

Another aspect of the present invention includes an apparatus for reducing the aerodynamic drag of a bluff body in a flowstream in ground effect, the bluff body having a body portion and a wheel assembly supporting the body portion, comprising: means securable to the bluff body upstream of the wheel-axle assembly for deflecting airflow away from the wheel assembly to reduce the incident pressure thereon.

And still another aspect of the present invention includes an aerodynamic bluff-bodied vehicle comprising: a vehicle body; a wheel assembly supporting the vehicle body from thereunder; and a baffle assembly located upstream of the wheel assembly for deflecting airflow away from the wheel assembly to reduce the incident pressure thereon.

V. BRIEF DESCRIPTION OF THE DRAWINGS

The accompanying drawings, which are incorporated into and form a part of the disclosure, are as follows.

VI. DETAILED DESCRIPTION

Figure 1:
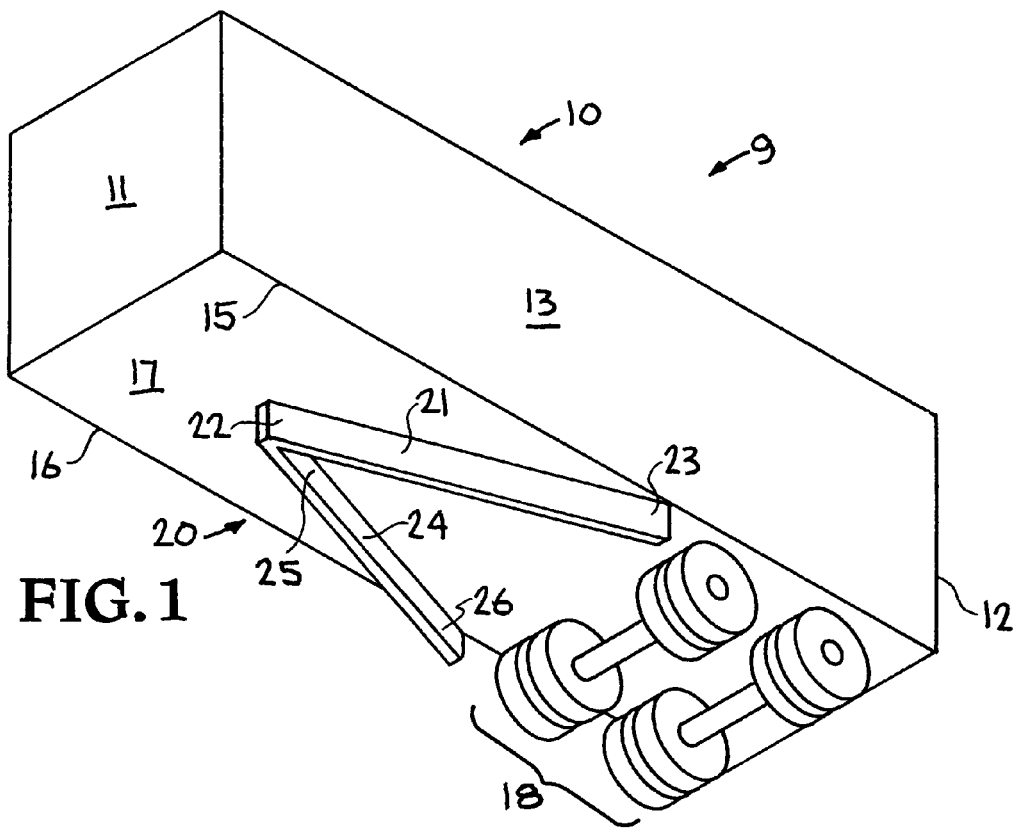
FIG. 1 is perspective view of a first embodiment of the apparatus of the present invention mounted underneath a trailer of a tractor-trailer arrangement.

The present invention is directed to an aerodynamic drag reduction apparatus for use with wheeled vehicles of a type generally having a vehicle body portion supported by one or more wheel assemblies located or extending below the body portion where it is impinged by an airflow that contributes to the net aerodynamic drag. In particular, the apparatus of the present invention is a baffle assembly mounted at a level below (e.g. directly underneath) the body portion upstream of a wheel assembly, such that when placed in a flowstream, the baffle assembly deflects the airflow away from the wheel assembly. This deflection operates to reduce the incident pressure on the wheel assembly, and consequently reduces the overall aerodynamic drag of the vehicle.

The present invention may be utilized with different types of wheeled vehicles and wheeled vehicle combinations (e.g. towing arrangements) including automobiles, trains, aircraft, or any other vehicle having one or more wheel assemblies located or extending below a body portion of the vehicle which is impinged by an airflow to produce aerodynamic drag. In FIGS. 1–9 of the drawings and the following discussion, a conventional trailer 9 of a tractor-trailer arrangement (not shown) has been selected as a representative wheeled vehicle to illustrate the problem of aerodynamic drag caused by wheel assemblies, as well as showcase the solutions provided by the various embodiments of the present invention. In particular, the trailer 9 has a vehicle body portion 10 with a forward end 11, a tail end 12, a left side 13, a right side 14, a left side lower edge 15, a right side lower edge 16, an underside 17, and a rear wheel assembly 18 near the tail end 12. A load associated with the body portion (and any cargo) is carried at the forward end 11 by a tractor (not shown) and at the tail end 12 by the rear wheel assembly 18. As used herein and in the claims, "wheel assembly" includes any combination of wheels, tires, axles, differentials, and other wheel-related structure, such as struts, shocks, springs, control arms, etc., or any portions thereof, located or extending below the body portion as a unit group. Thus, the rear wheel assembly 18 shown in the figures and particularly comprising two axles and four wheels per axle, is considered a unit group which supports the tail end 12 of the body portion 10.

Figure 2:
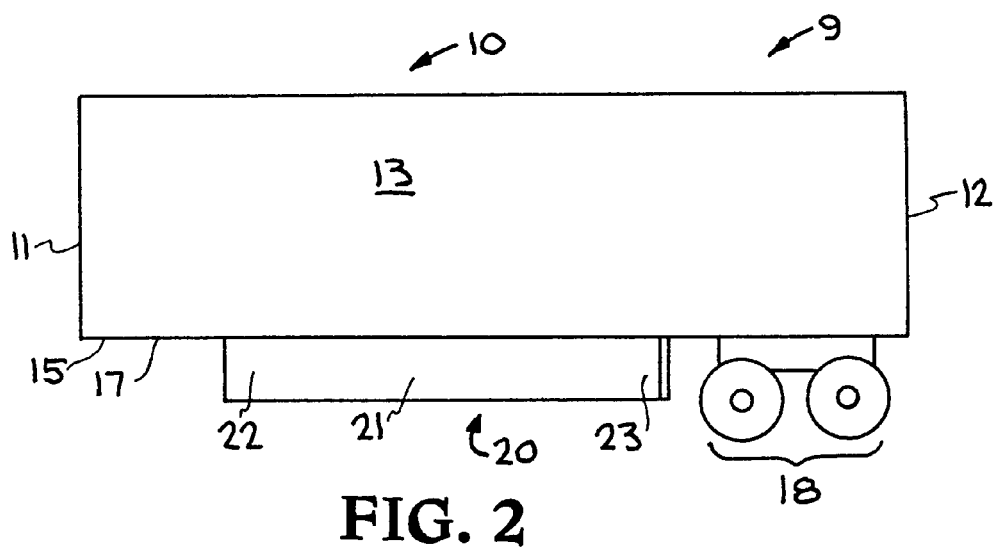
FIG. 2 is a side view of the apparatus of FIG. 1.
Figure 3:
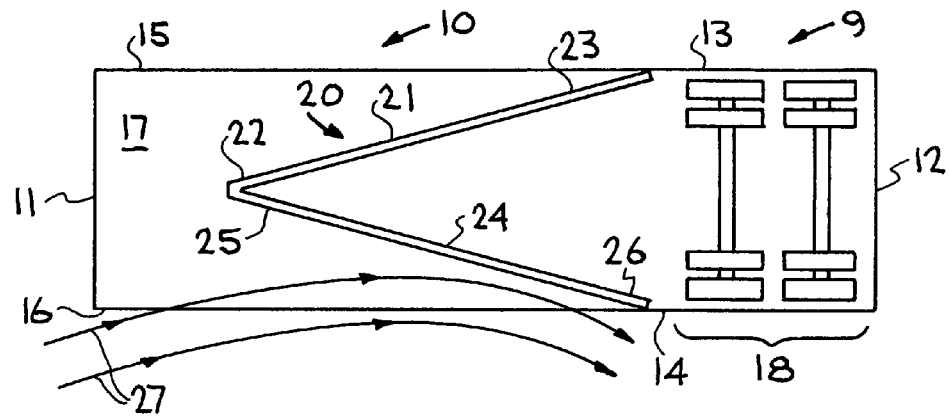
FIG. 3 is a bottom view of the apparatus of FIG. 1.

FIGS. 1–3 show an exemplary first embodiment of the apparatus of the present invention having an aerodynamic drag-reducing skirt, such as a wedge-shaped skirt arrangement 20. The skirt 20 is mounted on the underside 17 of the vehicle body portion 10 in front of the rear wheel assembly 18, using fasteners or other mounting hardware (not shown) of a type known in the relevant arts. The skirt 20 has left and right panels 21, 24, respectively, extending down from the underside 17 of the body portion 10, and angled to deflect airflow away from the rear wheel assembly 18. The left panel 21 has a leading end 22 and a trailing end 23, and the right panel 24 has a leading end 25 and a trailing end 26. The leading ends 22, 25 are shown connected at a relatively sharp angle, and the trailing ends 23, 26 are shown diverging from each other as they extend toward the rear wheel assembly 18. It is appreciated, however, that the left and right panels 21 and 24 may be part of a unitary construction, and the leading ends thereof may be integrally connected, either at an angle (as shown), or with a curvilinear or otherwise continuous shape. And the panels themselves, while shown as straight panels, may also have a concave or convex curvilinear configuration. In any case, the leading end of the skirt 20 is narrower than the trailing end in a swept-back configuration that is generally characterized as a "wedge-shape." With this swept-back configuration, the wedge-shaped skirt 20 functions to deflect airflow away from the rear wheel assembly 18, i.e. in a transversely outward direction from a longitudinal central axis 19 of the trailer 10, when placed in a flowstream, especially a flowstream influenced by sidewinds, generally shown as 27 in FIG. 3. This in turn, reduces the incident pressure on the rear wheel assembly 18 and contributes to the overall aerodynamic drag of the vehicle.

Figure 4:
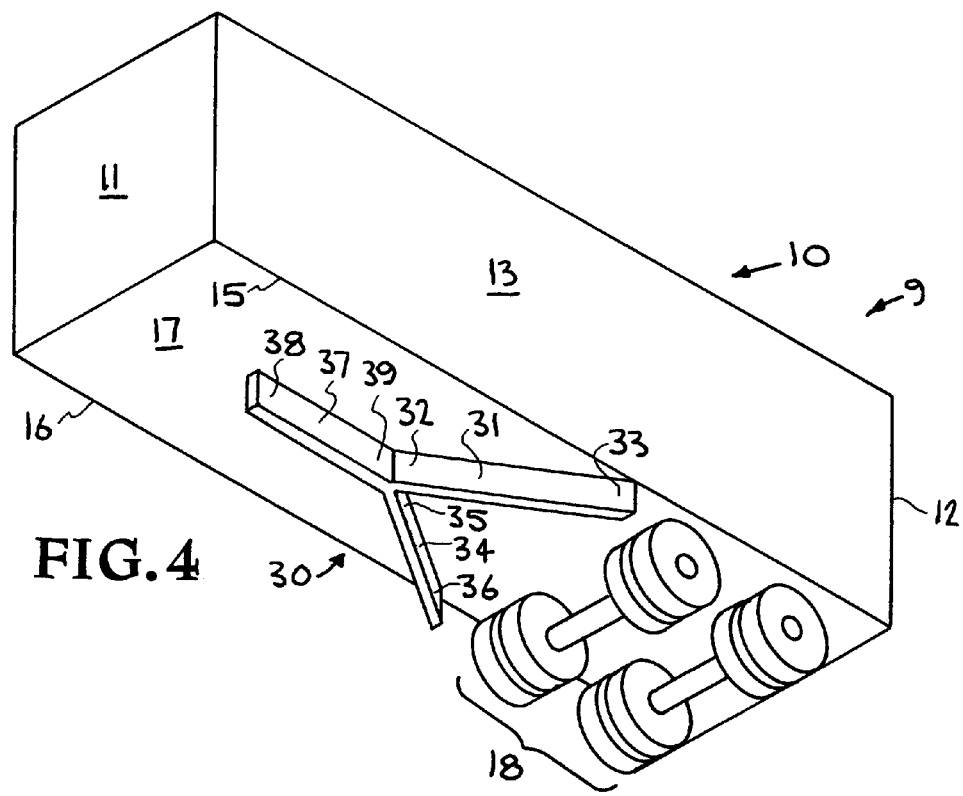
FIG. 4 is a perspective view of a second embodiment of the apparatus of the present invention mounted underneath a trailer of a tractor-trailer arrangement.
Figure 5:
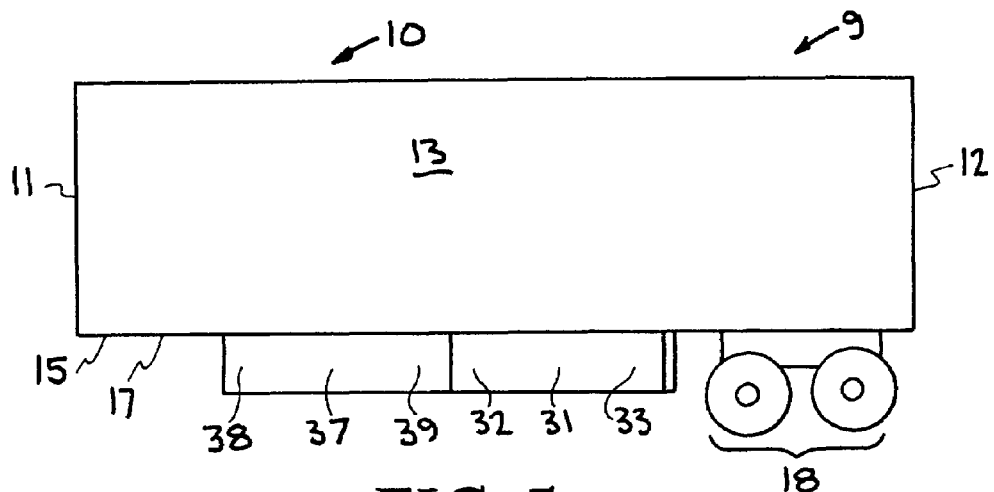
FIG. 5 is a side view of the apparatus of FIG. 4.
Figure 6:
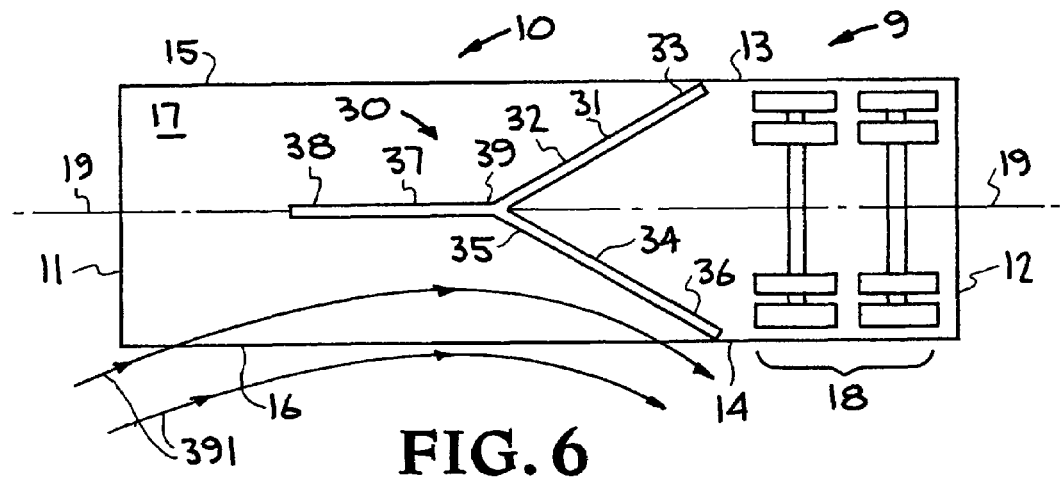
FIG. 6 is a bottom view of the apparatus of FIG. 4.

In FIGS. 4–6, an exemplary second embodiment of the present invention is shown, generally indicated at reference character 30, and having a wedge-shaped skirt portion with a left panel 31 and a right panel 34 similar to but shorter than the wedge-shaped skirt 20 of FIGS. 1–3, and a third forward panel 37 connected to the wedge-shaped portion at a forward location thereof. In particular, the left panel 31 has a leading end 32, and a trailing end 33, and the right panel 34 has a leading end 35 and a trailing end 36. The third forward panel 37 also has a leading end 38 and a trailing end 39, with the trailing end 39 connected to the joined leading ends 32, 35 of the wedge-shaped portion. The third forward panel 37 is shown centrally aligned with the longitudinal central axis 19 of the trailer 10. Similar to FIGS. 1–3, it is appreciated, that the left and right panels 31 and 34 may be part of a unitary construction, and the leading ends thereof may be integrally connected, either at an angle (as shown), or with a curvilinear or otherwise continuous shape. And the panels themselves, while shown as straight panels, may also have a concave or convex curvilinear configuration. In any case, the leading end of the skirt portion is narrower than the trailing end in a swept-back configuration that is generally characterized as a "wedge-shape." And similar to FIGS. 1–3, the baffle assembly 30 functions to deflect airflow away from the rear wheel assembly 18 in a transversely outward direction from the longitudinal centerline 19 when placed in a flowstream, especially a flowstream influenced by sidewinds, such as shown by reference character 391 in FIG. 6. Moreover, the third panel 37 may serve to impede cross-flow of the flowstream across the underside 17 of the vehicle body 10, which is also known to contribute to aerodynamic drag.

Figure 8:
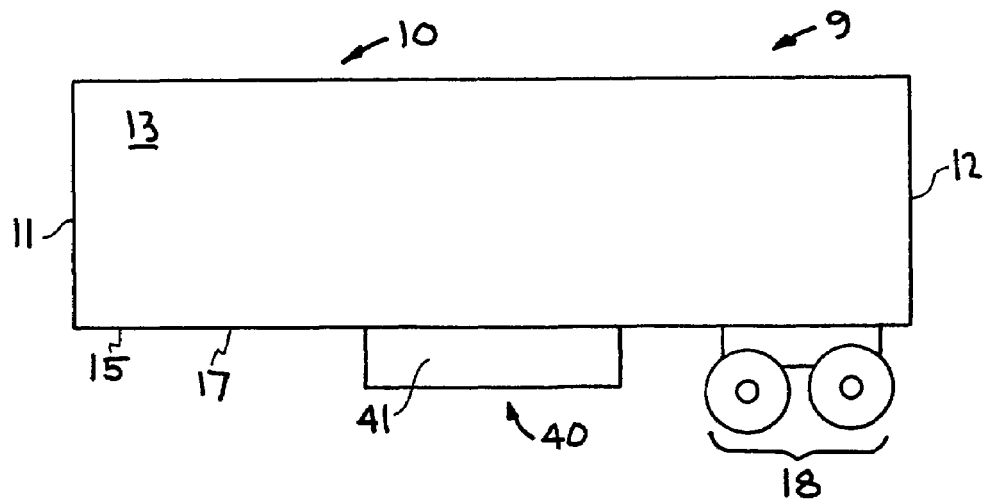
FIG. 8 is a side view of the apparatus of FIG. 7.
Figure 7:
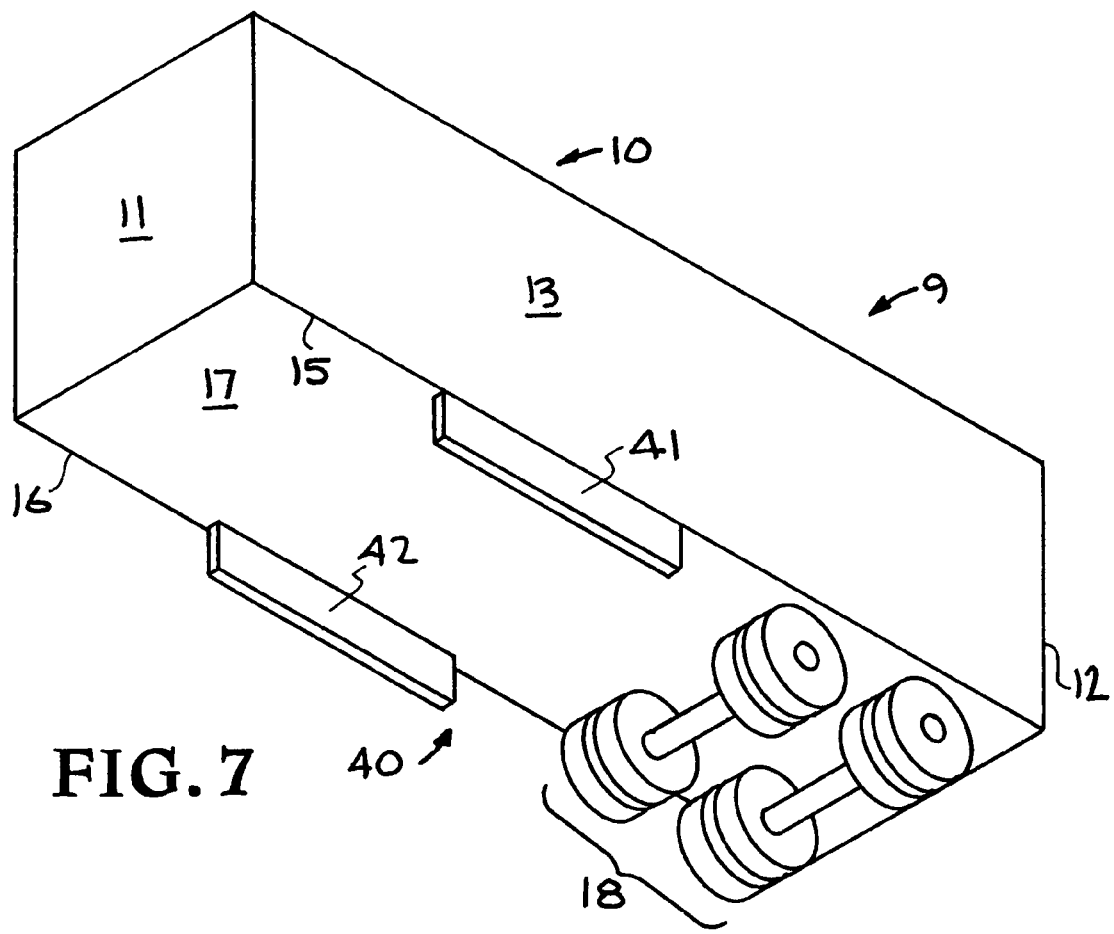
FIG. 7 is a perspective view of a second embodiment of the apparatus of the present invention mounted underneath a trailer of a tractor-trailer arrangement.
Figure 9:
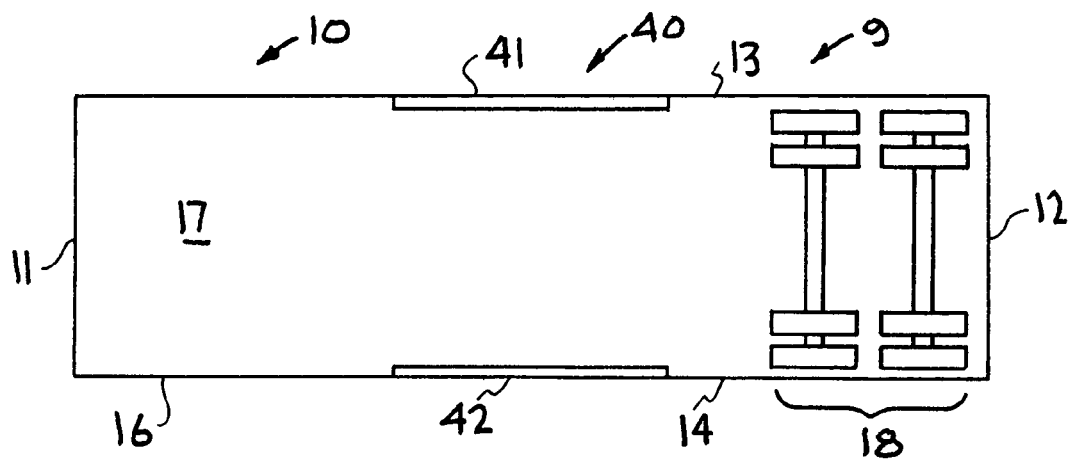
FIG. 9 is a bottom view of the apparatus of FIG. 7.

In FIGS. 7–9, an exemplary third embodiment of the present invention is shown generally indicated at reference character 40, and comprising a pair of side skirts 41, 42, shown parallel, mounted at or near the transversely opposite sides of the body portion 10. In particular, the side skirts may be directly mounted to the underside 17 of the body portion 10 to extend therebelow, or mounted to the side of the body portion 10 to extend down to a level below the body portion 10. In either case, the side skirts 41, 42 are located near left and right side lower edges 15 and 16, respectively, so as to impede airflow into and across the underside 17 of the trailer 10.

The side skirts 41, 42 are shown in FIG. 7-9 as being shorter than the length of the trailer 9. However, both the length and location of the side skirts can be optimized to provide the greatest airflow impedance and drag reduction. To this end, it is appreciated that the skirts of the first, second and third embodiment described above may be configured to span all or a portion of the length of the vehicle body's underside. Shorter skirts that do not span the entire underside of the vehicle body, however, can provide a vehicle operator with easier access to the underside. To this end, the shorter skirts may be adapted with slidable or otherwise movable sections, enabling positional adjustments and customization. And various material types may be used for the construction of the exemplary first, second and third embodiments, such as lightweight rigid plastics, metals, composites, or other materials having a sufficiently rigid construction.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. An apparatus for reducing the aerodynamic drag of a wheeled vehicle in a flowstream, said vehicle having a vehicle body and a wheel assembly supporting the vehicle body from thereunder, comprising:
   a baffle assembly including a wedge-shaped skirt mountable to the wheeled vehicle underneath the vehicle body and upstream in front of the wheel assembly, said wedge-shaped skirt comprising two panels connected to each other at leading ends thereof and diverging away from each other to trailing ends located adjacent the wheel assembly so as to deflect airflow away from the wheel assembly and reduce the incident pressure thereon.

2. An aerodynamic bluff-bodied vehicle comprising:
   a vehicle body;
   a rear wheel assembly supporting the vehicle body from thereunder near a tail end of the vehicle body; and
   a baffle assembly located upstream of the rear wheel assembly for deflecting airflow away from the rear wheel assembly to reduce the incident pressure thereon, said baffle assembly positioned underneath the vehicle body in front of the rear wheel assembly, and including a wedge-shaped skirt comprising two panels extending down from the underside of the vehicle body, the two panels connected to each other at leading ends thereof, and diverging away from each other to trailing ends located adjacent the rear wheel assembly.

3. The aerodynamic bluff-bodied vehicle of claim 2, wherein the aerodynamic bluff bodied vehicle is a trailer of a tractor-trailer arrangement, with the vehicle body of the trailer having a leading end supportable by a tractor, and a trailing end supported by the rear wheel assembly.

4. An apparatus for reducing the aerodynamic drag of a wheeled vehicle in a flowstream, said vehicle having a vehicle body and a wheel assembly supporting the vehicle body from thereunder, comprising:

a baffle assembly mountable underneath the vehicle body and upstream in front of the wheel assembly so as to deflect airflow away from the wheel assembly and reduce the incident pressure thereon, said baffle assembly including:

a wedge-shaped skirt comprising two panels adapted to extend down from the underside of the vehicle body when mounted thereto, the two panels connected to each other at leading ends thereof and diverging away from each other to trailing ends located adjacent the wheel assembly; and a third panel having a leading end, and a trailing end connected to the leading end of the wedge-shaped skirt.

5. An aerodynamic bluff-bodied vehicle comprising:

a vehicle body;

a rear wheel assembly near a tail end of the vehicle body for supporting the vehicle body from thereunder; and a baffle assembly located underneath the vehicle body and upstream in front of the rear wheel assembly for deflecting airflow away from the rear wheel assembly to reduce the incident pressure thereon, said baffle assembly including:

a wedge-shaped skirt comprising two panels extending down from the underside of the vehicle body, the two panels connected to each other at leading ends thereof and diverging away from each other to trailing ends located adjacent the rear wheel assembly; and a third panel having leading and trailing ends, with the trailing end of the third panel connected to the leading end of the wedge-shaped skirt.

* * * * *